United States Patent
Yang et al.

(10) Patent No.: US 9,989,770 B2
(45) Date of Patent: Jun. 5, 2018

(54) DISPLAY MODULE ASSEMBLY AND AN ELECTRONIC DEVICE USING THE SAME

(71) Applicant: SHENZHEN ROYOLE TECHNOLOGIES CO. LTD., Shenzhen (CN)

(72) Inventors: Songling Yang, Shenzhen (CN); Songya Chen, Shenzhen (CN); Zihong Liu, Shenzhen (CN)

(73) Assignee: SHENZHEN ROYOLE TECHNOLOGIES CO., LTD., Shenzhen, Guangdong (CN)

(*) Notice: Subject to any disclaimer, the term of this patent is extended or adjusted under 35 U.S.C. 154(b) by 149 days.

(21) Appl. No.: 15/056,851

(22) Filed: Feb. 29, 2016

(65) Prior Publication Data
US 2016/0349519 A1    Dec. 1, 2016

Related U.S. Application Data

(63) Continuation of application No. PCT/CN2015/080363, filed on May 29, 2015.

(51) Int. Cl.
*G02B 27/01* (2006.01)

(52) U.S. Cl.
CPC ..... *G02B 27/0176* (2013.01); *G02B 27/0179* (2013.01); *G02B 2027/0154* (2013.01)

(58) Field of Classification Search
CPC ........ G02B 2027/0154; G02B 27/0176; G02B 27/0179

(Continued)

(56) References Cited

U.S. PATENT DOCUMENTS 5,737,012 A * 4/1998 Tabata ................ G02B 27/017
                                                                   345/8
2006/0072206 A1* 4/2006 Tsuyuki ............ G02B 27/0172
                                                                 359/631

(Continued)

FOREIGN PATENT DOCUMENTS

| CN | 2819243 Y | 9/2006 |
| CN | 2938154 Y | 8/2007 |

(Continued)

OTHER PUBLICATIONS

International Search Report and Written Opinion, PCTCN2015080363, dated Feb. 3, 2016, 9 pgs.

*Primary Examiner* — Tony Davis
(74) *Attorney, Agent, or Firm* — Morgan, Lewis & Bockius LLP

(57) ABSTRACT

This disclosure relates to a display module assembly that includes two optical module assemblies, two first adjustment mechanisms, two image generation devices, and two second adjustment mechanisms each corresponding to one of the first adjustment mechanisms. Each first adjustment mechanism is movably connected to a corresponding one of the optical module assemblies for adjusting distance between the two optical module assemblies. Each image generation device is movably connected to a corresponding one of the optical module assemblies, and project an image to a predetermined direction through its corresponding optical module assembly. Each second adjustment mechanism is movably connected to corresponding one of the image generation devices for adjusting a distance between the image generation device and the optical module assembly. The display module assembly and an electronic device in this disclosure can adjust an interpupillary distance and a diopter so as to adapt for different users.

16 Claims, 3 Drawing Sheets

(58) Field of Classification Search
USPC .......................................................... 345/633
See application file for complete search history.

(56) References Cited

U.S. PATENT DOCUMENTS

| | | | | |
|---|---|---|---|---|
| 2012/0069448 A1* | 3/2012 | Sugihara | ............ | G02B 27/0176 |
| | | | | 359/643 |
| 2012/0098971 A1* | 4/2012 | Hansen | ................ | H04N 5/2258 |
| | | | | 348/164 |
| 2012/0162764 A1* | 6/2012 | Shimizu | ............... | H04N 13/044 |
| | | | | 359/473 |
| 2014/0320972 A1* | 10/2014 | Magyari | ............ | G02B 27/0172 |
| | | | | 359/630 |
| 2015/0103606 A1 | 4/2015 | Seong | | |
| 2016/0005231 A1* | 1/2016 | Yamaga | ................... | G02B 7/12 |
| | | | | 345/633 |

FOREIGN PATENT DOCUMENTS

| CN | 103149690 A | 6/2013 |
|---|---|---|
| CN | 104635340 A | 5/2015 |

* cited by examiner

DISPLAY MODULE ASSEMBLY AND AN ELECTRONIC DEVICE USING THE SAME

RELATED APPLICATION

This application is a continuation application of PCT Patent Application No. PCT/CN2015/080363, entitled "DISPLAY MODULE ASSEMBLY AND AN ELECTRONIC DEVICE USING THE SAME" filed on May 29, 2015, which is incorporated by reference in its entirety.

TECHNICAL FIELD

This disclosure relates to adjustment mechanisms and in particular to an adjustable display module assembly and an electronic device using the same.

BACKGROUND

Near-eye display devices such as a head mounted display (HMD) are becoming popular now. The working principle of the HMD is to magnify an image on an ultra micro display screen through a group of high-precision optical lens and to project the image onto eyes, so that a user wearing the near-eye device can see a magnified virtual image similar to the one generated by a magnifying lens. In order to adapt the same device for interpupillary distances of different users, the existing HMDs have an interpupillary distance adjustment function. But the existing HMDs cannot adjust a diopter to adapt for a myopic or a hypermetropic user.

SUMMARY OF THIS DISCLOSURE

Display module assemblies capable of adjusting both an interpupillary distance and a diopter, and electronics devices including those display module assemblies are provided in implementations of this disclosure.

A display module assembly includes two optical module assemblies, two first adjustment mechanisms, two image generation devices, and two second adjustment mechanisms each corresponding to one of the first adjustment mechanisms. Each first adjustment mechanism is movably connected to a corresponding one of the optical module assemblies for adjusting distance between the two optical module assemblies. Each image generation device is movably connected to a corresponding one of the optical module assemblies, and projects an image to a predetermined direction through its corresponding optical module assembly. Each second adjustment mechanism is movably connected to a corresponding one of the image generation devices for adjusting a distance between the image generation device and the optical module assembly.

An electronic device includes a housing and the above-described display module assembly held within the housing, where at least part of the first and the second adjustment mechanisms extends outside the housing.

In this disclosure, the first adjustment mechanism can adjust the distance between the optical module assemblies to adjust an interpupillary distance; and the second adjustment mechanism can adjust the distance between the image generation device and its corresponding optical module assembly to adjust a diopter of the device. As such, the display module assemblies and the electronic devices in this disclosure can adjust the interpupillary distance and the diopter so as to adapt for more users.

BRIEF DESCRIPTION OF THE DRAWINGS

Respective implementations in this disclosure are described in detail in combination with following figures. It should be understood that each component shown in the figures is not to represent its actual dimension and proportional relation, and those figures are merely used for clear illustration rather than limitation to this disclosure.

DETAILED DESCRIPTION

In order to understand objectives, technical solutions and advantages of this disclosure more clearly, this disclosure will be further described in detail with reference to multiple implementations and figures. It should be understood that those specific implementations described herein are merely for explaining rather than limiting this disclosure. It has to be pointed out that, "connection" between two components herein is not necessarily meant to direct connection, while indirect connection by virtue of a third component can also be represented by the "connection" between two components herein.

Figure 1:
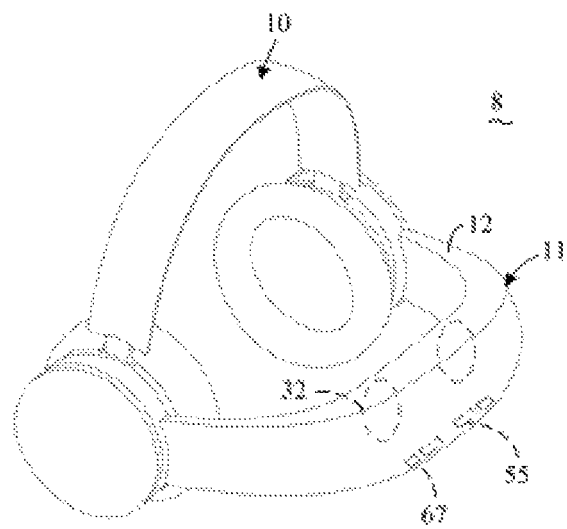
FIG. 1 is a schematic diagram for a wearable electronic device according to an embodiment of this disclosure.
Figure 2:
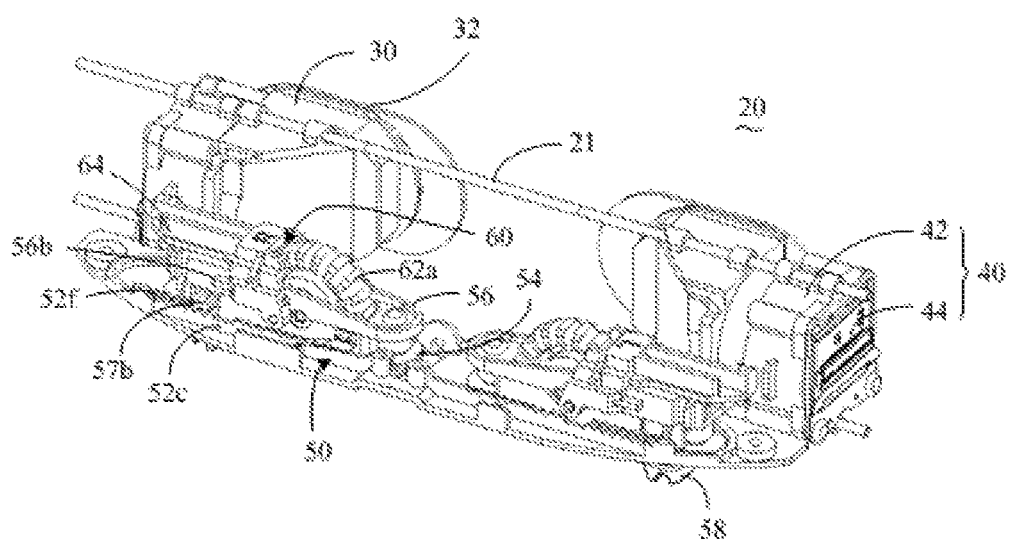
FIG. 2 is a schematic diagram for a display module assembly of the wearable electronic device in FIG. 1.

Referring to FIGS. 1 and 2, they are schematic diagrams for a wearable electronic device 8 provided in an implementation of this disclosure. The electronic device 8 can be a wearable video player, a wearable game device or a wearable navigator. The electronic device 8 includes an earphone 10 and a display module 11 in rotatable connection to the earphone 10. The display module 11 includes a housing 12 and a display module assembly 20 held within the housing 12. The display module 11 also includes related circuits and a battery which are not shown in the figures. The display module assembly 20 includes two optical module assemblies 30, two image generation devices 40, two first adjustment mechanisms 50 and two second adjustment mechanisms 60.

Each image generation device 40 is movably connected to a corresponding one of the optical module assemblies 30, and an image generated by each image generation device 40 is projected in a predetermined direction through the corresponding optical module assembly 30. Each first adjustment mechanism 50 is connected to a corresponding one of the optical module assemblies 30, and it is capable of adjusting a distance between the two optical module assemblies 30. Each second adjustment mechanism 60, which is configured to correspond to one of the first adjustment mechanisms 50, is connected to corresponding one of the image generation devices 40, and it is capable of adjusting a distance between the image generation device 40 and the optical module assembly 30 corresponding to the image generation device. The first adjustment mechanism 50 and the second adjustment mechanism 60 are at least partially exposed outside the housing 12 for the convenience of user adjustment. As such, the display module assembly 20 enables a user to adjust both an interpupillary distance and a diopter, and thus is suitable for different users.

Each optical module assembly 30 includes a lens barrel and at least one lens group built within the lens barrel. The lens barrel has an entrance port (not shown in figure) and an exit port 32. The entrance port is located on one side facing the image generation device 40, through which light entering the entrance port is refracted and reflected by the lens group and finally emitted through the exit port 32. Each image generation device 40 includes a base 42 and a micro-display module assembly 44 disposed on the base 42. The micro-display module assembly 44 includes a micro-display (not shown in figure) such as an Organic Light-Emitting Diode (OLED) micro-display. Moreover, the micro-display module assembly 44 is configured in such a way that the light of an image displayed on the micro-display can enter the entrance port and is projected in the predetermined direction by the lens group. The light emitted from the exit port 32 is then incident onto human eyes so that the human eyes can see a magnified virtual image of the image displayed by the micro-display.

The display module assembly 20 further includes two guide rails 21 in this implementation. Through hole(s) is/are respectively provided for both the optical module assemblies 30 and the image generation devices 40 to connect those components to the two guide rails 21, and accordingly the optical module assemblies 30 and the image generation devices 40 move in a direction defined by the guide rails 21. It can be understood, however, that the optical module assemblies 30 and the image generation devices 40 can each be provided with a respective guide rail in order to achieve the direction guiding function. In addition, a structure of the guide rail is not limited to what is shown in the figure. For example, the guide rail can be a slot (not shown in figure) within the housing 12, and the optical module assemblies 30 and the image generation devices 40 are held within the slot and are capable of moving in a direction defined by the slot. The guide rail is not limited in specific implementations as long as it can function as direction guiding.

Figure 3:
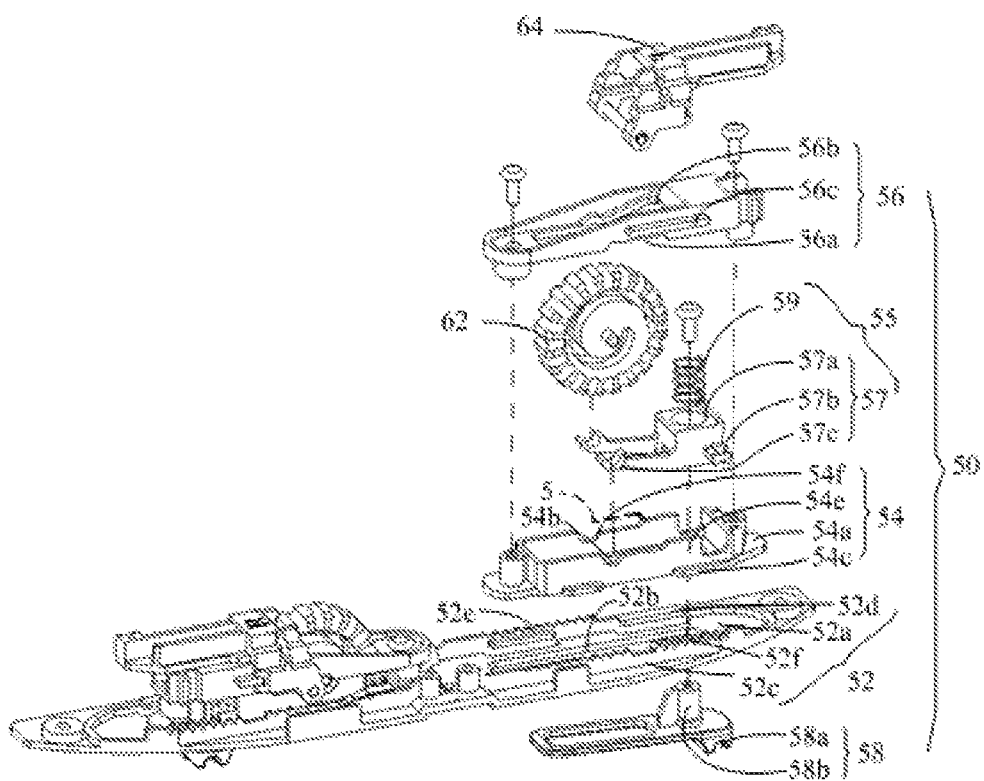
FIG. 3 is a partial exploded diagram for the display module assembly in FIG. 2, where an optical module assembly and an image generation device of the display module assembly in FIG. 2 are not shown in FIG. 3.
Figure 4:
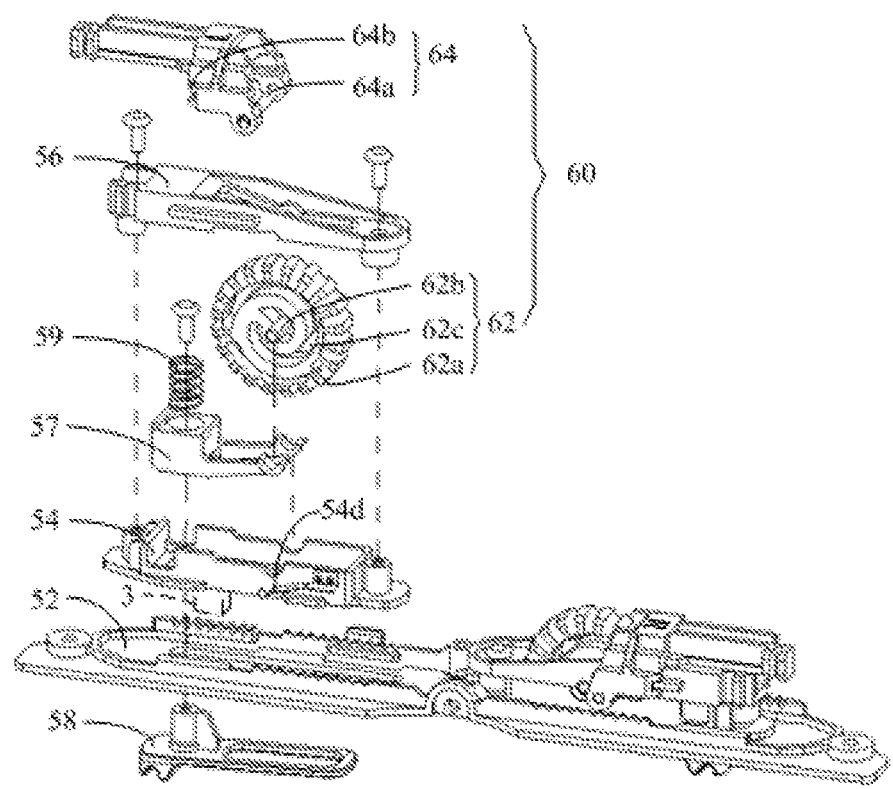
FIG. 4 is a schematic diagram showing FIG. 3 from a different view.

Referring to FIGS. 2-4, each first adjustment mechanism 50 includes a base 52, a first moving element 54 movably connected to the base 52, a covering element 56 fixedly connected to the first moving element 54, and a first operating element fixedly connected to the first moving element 54. The covering element 56 is connected to the optical module assembly 30. The first operating element 58 drives the first moving element 54 to move during its movement, such that the optical module assembly 30 moves together with the first moving element 54. Each second adjustment mechanism 60 includes a second operating element 62 and a second moving element 64 movably connected to the second operating element 62. The second operating element 62 is movably engaged with the first moving element 54, and the second moving element 64 can be moved by the second operating element 62. The second moving element 64 is connected to the image generation device 40 such that, when the second moving element 64 is moved by the second operating element 62, the image generation device 40 starts to move. Also the second adjustment mechanism 60 and the image generation device 40 can move synchronously following the movement of the first adjustment mechanism 50.

The base 52 includes a base plate 52a which is provided with one first through hole 52b extending along a first direction. The base plate 52a in this implementation has substantially a rectangular shape, and the first direction refers to a length direction of the base plate 52. The first moving element 54 includes a bottom plate 54a that also has a rectangular shape in this implementation, where a second through hole 54b extending along the first direction is provided on the bottom plate 54a. The first operating element 58 includes an operating part 58a and a connection part 58b extending along two opposite directions. In this implementation, the operating part 58a and the optical module assemblies 30 are located on two opposite sides of an upper side of the base 52; the operating part 58a includes a slot extending along a width direction of the base plate 52a, and thus the user can insert his nail into this slot to perform an operation conveniently. The connection part 58b is a post provided with a screw hole, where the connection part can first pass through the first through hole 52b and then be fixed to the first moving element 54 by inserting into the second through hole 54b so that the first moving element 54 and the first operating element 58 move together synchronously. During the movement, the first through hole 52 can be set to limit the movement of the first operating element 58 along the first direction. It should be understood that, an embossment that extends outside the first through hole 52b from the first moving element 54 can also be provided so as to adjust the first moving element 54. For example, a dashed line component associated with a numeral reference 3 shown in FIG. 4 can also bring convenience to the user's operation, and the first operating element 58 can be omitted in this case.

In this implementation, the second operating element 62 is rotatably configured with respect to the first moving element 54, and the second moving element 64 is driven by the rotating second operating element 62 to have translation along the first direction, thereby driving the image generation device 40 to move. Specifically, the second operating element 62 includes a roller 62a and a rolling shaft 62b. The rolling shaft 62b is provided on a central axis of the roller 62a and is supported by the first moving element 54, where the roller can rotate around the rolling shaft 62b. The roller 62a is provided with a spiral-shape accommodating hole 62c that extends from an inner side adjacent to the rolling shaft 62b to an outer edge of the roller 62a. The second moving element 64 includes a slide bar 64a configured in the width direction of the base plate 52a.

A recessed part 56a extending along the first direction is provided in an intermediate portion between two opposite sides of the covering element 56. Two sides of the covering element 56 are fixed to the first moving element 54 by screws, while the rolling shaft 62b is confined within the recessed part 56a between the covering element 56 and the first moving element 54. In this way, the second operating element 62 is not only hard to be separated from the first moving element 54, but also capable of sliding along the first direction. For the same purpose, a corresponding position-limiting element can be alternatively provided on the first moving element 54. For example, a dashed line component indicated by a numeral reference 5 shown in FIG. 3 can be a position-limiting element, and the covering element 56 can be omitted in this case. In this implementation, the covering element 56 is provided with a third through hole 56b along the first direction, where a portion of the roller 62a extends outside the covering element 56 through the third through hole 56b so as to improve a space usage.

The second moving element 64 is movably provided on the covering element 56. Meanwhile, the slide bar 64a passes through the accommodating hole 62c such that the slide bar can slide along a spiral-shape trace as defined by the accommodating hole 62c. As such, a distance between the slide bar 64a and the rolling shaft 62b will be changed during rotation of the roller 62a, and thus the second moving element 64 translates in a first direction so as to drive the image generation device 40 to move. According to the above-described implementations, during operation, the user may adjust the interpupillary distance by sliding the first operating element(s) 58 to adjust the distance between the two optical module assemblies 30; in this process, the second adjustment mechanism(s) 60 and the image generation device(s) 40 move synchronously following the first adjustment mechanism(s) 50. Additionally, the user can adjust the distance between the image generation device 40 and the optical module assembly 30 by rotating the roller 62a to adjust the diopter to adapt for user's prescription of myopia or hyperopia. In this way, the display module assembly described in such implementation achieves the adjustment for both the interpupillary distance and the diopter, and thus it can be suitable for different users.

It should be understood that the second moving element 64 can be directly provided on the first moving element 54 instead of the covering element 56 in some other implementations. Additionally, the translational movement through the rotation of the second adjustment mechanism 60 can also be realized without being by the above-described implementations. In an example, the second operating element can also be a screw rod that is provided with a first screw thread and is configured along a direction indicated by an assembling dashed line in FIG. 4; the second moving element is provided with a second screw thread which is matched with the first screw thread. In this case, the second moving element can translate in the first direction when the second moving element is driven to rotate. The person skilled in the art is familiar with specific arrangements of the screw threads, and thus those specific arrangements are not described herein.

Preferably, the base 52 further includes a first guiding part 52c that is provided on the base plate 52a and extends along the first direction, where the first guiding part 52c is coupled with the first moving element 54 so as to further limit the movement of the first moving element 54 along the first direction. At this point, the first through hole 52b can be provided without direction guiding function. In this implementation, the first guiding part 52c is two edges extending upwards from the base plate 52a. Specifically, the first guiding part 52c can be the edges that respectively extend on two opposite sides of the base plate 52a towards the first moving element 54. More preferably, the base 52 further includes a first position-limiting part 52d, and the first moving part 54 correspondingly includes a second position-limiting part 54c. The first position-limiting part 52d and the second position-limiting part 54c work in concert with each other, so as to prevent the first moving element 54 from being separated from the base 52 in a direction substantially perpendicular to the first direction. In this implementation, the second position-limiting part 54c can extend outwardly from two opposite sides of the bottom plate 54a of the first moving element 54, and the first position-limiting part 52d extends from one edge towards the other edge of the first guide part 52c. As such, the second position-limiting part 54c is located between the first position-limiting part 52d and the base plate 52a under the limitation of the first position-limiting part 52d.

Preferably, the base 52 is provided with an alternating-ridge-groove part 52e, the first moving element 54 is further provided with an elastic belt 54d, and the elastic belt 54d is in a deformation status to press against the alternating-ridge-groove part 52e. In this way, during the sliding of the first moving element 54, a signal in the form of vibration and/or voice can be provided to the user to indicate that the first moving element is sliding, thereby facilitating the user's operation, where the signal is obtained by mutual interaction between the elastic belt 54d and the alternating-ridge-groove part 52e.

Preferably, the first adjustment mechanism 50 further includes a positioning module assembly 55 which is connected to and moves together with the first moving element 54. The positioning module assembly 55 is used to fix the first moving element 54 at a predefined location through its coordination with the base 52 after the optical module assembly 30 is moved to the predefined location following the first adjustment mechanism 50. Specifically, the base 52 further includes a first engagement part 52f. The positioning module assembly 55 includes a connection element 57 and an elastic element 59. The connection element 57 includes a hosting part 57a hosting the elastic element 59 and a second engagement part 57b. For the purpose of positioning, the first engagement part 52f and the second engagement part 57b are coupled to each other under the action of the elastic element 59. Besides, when the first engagement part 52f and the second engagement part 57b are not coupled to each other under external force, the elastic element 59 applies elastic push force to the connection element 57 to cause the first engagement part 52f and the second engagement part 57b to be coupled to each other.

When the first engagement part 52f is separated from the second engagement part 57b by applying force on the elastic element 59, the location of the first moving element 54 can be adjusted. With no external force; the first engagement part 52f and the second engagement part 57b are coupled together by the elastic element 59 once again to lock a current location. In this way, a fault operation can be effectively avoided, or the location of the first adjustment mechanism 50 is prevented from being moved by fault when adjusting the second adjustment mechanism 60. In this implementation, the first engagement part 52 $f$ has an alternating-ridge-groove structure disposed on a top surface of the edge of the first guiding part 52c and is provided with a certain length along the first direction, while the second engagement part 57b also has a alternating-ridge-groove structure matching the first engagement part 52f. The hosting part 57a is a recess disposed at one end of the connection element 57. One end of the elastic element 59 is held within the recess, and its other end presses against the covering element 56, where the elastic element 59 is kept in a compressed status. Additionally, a connection part 58b of the first operating element 58 can be fixed to the hosting part 57a of the connection element 57 through screw(s).

Further, the connection element 57 also includes a supporting part 57c, and the hosting part 57a and the supporting part 57c are located at two opposite ends of the connection element 57. The supporting part 57c is rotatably connected to the first moving element 54, where the connection element 57 can rotate around the supporting part 57c and the second operating element 62 is rotatably provided on the supporting part 57c. In this way, the connection element 57 is prevented from potential location deviation after several adjustment operations. The supporting part 57c has a semicircle shape in this implementation; the first moving element 54 preferably includes a side plate 54e extending upwards from the bottom plate 54a. A semicircle recess 54f is disposed on the side plate 54e, the semicircle supporting part 57c is housed within the recess 54f, the rolling shaft 62b of the second operating element 62 sits on the supporting part 57c, and the recessed part 56a of the covering element 56 presses against the rolling shaft 62b. In this case, the supporting part 57c can rotate flexibly within the recess 54f after the second operating element 62 is pressed down (i.e., moving upwards in the orientation of FIG. 3), and the location of the connection element 57 is fixed as well.

Preferably, the two opposite sides of the covering element 56 are also provided with a third position-limiting part 56c respectively, and the second moving element 64 is correspondingly provided with a fourth position-limiting part 64b, where the third position-limiting part 56c and the fourth position-limiting part 64*b* work in concert with each other so that the second moving element 64 is prevented from being separated from the covering element 56 in a direction substantially perpendicular to the first direction. Meanwhile, the third position-limiting part 56*c* and the fourth position-limiting part 64*b* can work in concert with each other to achieve the direction guiding. In this implementation, the third position-limiting part 56*c* is a bar protruding respectively from two opposite sides of the covering element 56 and extending along the first direction, and the fourth position-limiting part 64*b* is an elongated slot disposed on the second moving element 64 along the first direction. It can be understood that the third position-limiting part can be provided on the first moving element in some other implementations.

Those described above are merely preferred implementations rather than limitations of this disclosure. Any modification, equivalent replacement and improvement falling within the spirit and principle of this disclosure should be included in the scope of protection of this disclosure.

What is claimed is:

1. A display module assembly, comprising:
   two optical module assemblies;
   two first adjustment mechanisms, each of the two first adjustment mechanisms connected to a corresponding one of the two optical module assemblies, wherein the two first adjustment mechanisms are configured to adjust a distance between the two optical module assemblies;
   two image generation devices, each of the two image generation devices movably connected to a corresponding one of the two optical module assemblies, wherein an image generated by each of the two image generation devices is configured to be projected in a predefined direction by a corresponding one of the two optical module assemblies; and
   two second adjustment mechanisms, each of the two second adjustment mechanisms corresponding to a respective one of the two first adjustment mechanisms and connected to a corresponding one of the two image generation devices, wherein each of the two second adjustment mechanisms is configured to adjust a distance between one of the two image generation devices and a corresponding one of the two optical module assemblies,
   wherein each of the two first adjustment mechanisms further comprises a base and a first moving element that is movably connected to the base, and a corresponding one of the two optical module assemblies is configured to move with the first moving element,
   wherein each of the two second adjustment mechanisms further comprises a second operating element and a second moving element movably connected to the second operating element, the second operating element is movably engaged with the first moving element and at least one portion of the second operating element and a corresponding optical module assembly are located higher than the base, and the second operating element is configured to drive the second moving element to move a corresponding image generation device.

2. The display module assembly as recited in claim 1, wherein the base further comprises a base plate and a first guiding part located on the base plate for defining a first direction, and the first guiding part is coupled to the first moving element for limiting a movement of the first moving element along the first direction.

3. The display module assembly as recited in claim 2, wherein the base further comprises a first position-limiting part, and the first moving element further comprises a second position-limiting part, the first position-limiting part works in concert with the second position-limiting part for preventing the first moving element from disengaging the base in a direction substantially perpendicular to the first direction.

4. The display module assembly as recited in claim 3, wherein the second position-limiting part extends outwards from two opposite sides of the first moving element, the first guiding part further comprises two edges respectively extending upwards from two opposite sides of the base plate, the first position-limiting part is positioned at the two edges, and the second position-limiting part is located between the first position-limiting part and the base plate.

5. The display module assembly as recited in claim 1, wherein the first adjustment mechanism further comprises a positioning module assembly connected to the first moving element, and the positioning module assembly works in concert with the base for fixing the first moving element at a predefined location after the optical module assembly is moved to the predefined location by the first adjustment mechanism.

6. The display module assembly as recited in claim 5, wherein the base further comprises a first engagement part, the positioning module assembly further comprises a connection element and an elastic element, and the connection element further comprises a hosting part connected to the elastic element and a second engagement part, the first engagement part and the second engagement part are coupled to each other by the elastic element for positioning.

7. The display module assembly as recited in claim 6, wherein the elastic element pushes the connection element to force the first engagement part and the second engagement part to be coupled together in response to an external force decoupling first engagement part from the second engagement part.

8. The display module assembly as recited in claim 6, wherein the first adjustment mechanism further comprises a first operating element connected to the connection element, at least one portion of the first operating element and a corresponding optical module assembly are located higher than the base, and an act on the first operating element causes deformation at the elastic element.

9. The display module assembly as recited in claim 8, wherein the first operating element further comprises a covering element fixed to the first moving element, and the positioning module assembly and the second operating element are both located between the first operating element and the covering element.

10. The display module assembly as recited in claim 9, wherein the second operating element further comprises a roller and a rolling shaft supported by the first moving element such that the roller rotates around an axis of the rolling shaft, the roller further comprises a spiral-shape accommodating hole extending from the rolling shaft to an outer edge of the roller, and the second moving element further comprises a slide bar passing through the accommodating hole and spirally sliding through the accommodating hole.

11. The display module assembly as recited in claim 10, wherein the covering element further comprises a second guiding part, the second moving element is movably confined by the covering element for moving along a direction defined by the second guiding part.

12. The display module assembly as recited in claim 6, wherein the connection element further comprises a supporting part rotatably located on the first moving element such that the connection element can rotate around the supporting part, the supporting part and the hosting part are positioned at two opposite ends of the connection element, and the second operating element is rotatably located on the supporting part.

13. The display module assembly as recited in claim 1, wherein the first adjustment mechanism further comprises a first operating element, the first operating element further comprising a covering element fixed to the first moving element, the second operating element is rotatably confined between the first operating element and the covering element, and the second moving element is movably confined by the covering element.

14. The display module assembly as recited in claim 13, wherein the second operating element comprises a roller and a rolling shaft, the rolling shaft being rotatably confined between the first operating element and the covering element such that the roller rotates around an axis of the rolling shaft, the roller further comprises a spiral-shape accommodating hole extending from the rolling shaft to an outer edge of the roller, and the second moving element further comprises a slide bar passing through the accommodating hole and spirally sliding through the accommodating hole.

15. An electronic device, comprising a housing and a display module assembly as recited in claim 1, wherein the display module assembly is located within the housing, and at least one portion of the two first adjustment mechanisms and the two second adjustment mechanisms extends outside the housing.

16. A display module assembly, comprising:
two optical module assemblies;
two first adjustment mechanisms, each of the two first adjustment mechanisms connected to a corresponding one of the two optical module assemblies, wherein the two first adjustment mechanisms are configured to adjust a distance between the two optical module assemblies;
two image generation devices, each of the two image generation devices movably connected to a corresponding one of the two optical module assemblies, wherein an image generated by each of the two image generation devices is configured to be projected in a pre-defined direction by a corresponding one of the two optical module assemblies; and
two second adjustment mechanisms, each of the two second adjustment mechanisms corresponding to a respective one of the two first adjustment mechanisms and connected to a corresponding one of the two image generation devices, wherein each of the two second adjustment mechanisms is configured to adjust a distance between one of the two image generation devices and a corresponding one of the two optical module assemblies,
wherein each of the two first adjustment mechanisms further comprises a base and a first moving element that is movably connected to the base, and a corresponding one of the two optical module assemblies is configured to move with the first moving element,
wherein the base further comprises an alternating-ridge-groove part, and the first moving element further comprises an elastic belt pressed against to the alternating-ridge-groove part in a deformation status.

\* \* \* \* \*